United States Patent [19]

Kogelnik et al.

[11] Patent Number: 4,981,878

[45] Date of Patent: Jan. 1, 1991

[54] PROCESS FOR THE PRODUCTION OF HEAT CURABLE FLEXIBLE POLYURETHANE MOLDED FOAMS

[75] Inventors: Hans-Joachim Kogelnik, Pittsburgh, Pa.; Martin Brock, Cologne; Hans Hettel, Roesrath, both of Fed. Rep. of Germany

[73] Assignee: Bayer Aktiengesellschaft, Bayerwerk, Fed. Rep. of Germany

[21] Appl. No.: 401,331

[22] Filed: Aug. 31, 1989

[30] Foreign Application Priority Data

Sep. 8, 1988 [DE] Fed. Rep. of Germany ....... 3830454

[51] Int. Cl.$^5$ .............................................. C08G 18/14
[52] U.S. Cl. .................................... 521/128; 521/160; 528/52
[58] Field of Search ........................... 521/128, 160, 52

[56] References Cited

U.S. PATENT DOCUMENTS 3,479,304  11/1969  Holmquist ............................ 260/2.5
4,833,176  5/1989  Wolf et al. ........................... 521/160

*Primary Examiner*—Maurice J. Welsh
*Assistant Examiner*—Duc Truong
*Attorney, Agent, or Firm*—Joseph C. Gil; Thomas W. Roy

[57] ABSTRACT

The present invention is directed to a process for the production of heat curable, flexible, polyurethane molded foams by the reacting inside a closed mold (a) polyisocyanates with (b) compounds having a molecular weight of 400 to about 10,000 and containing at least two isocyanate-reactive groups and (c) optionally chain lengthening and/or cross-linking agents in the molecular weight range of 32 to 399 and containing at least two isocyanate-reactive groups in the presence of (d) a catalyst based on carbonic acid diamide and (e) a blowing agent based on water, characterized in that 1. the polyisocyanates (a) are based on diphenylmethane diisocyanate which may optionally be alkyl substituted, toluylene diisocyanate, hexamethylene diisocyanate and/or isophorone diisocyanate, 2. carbonic acid diamide is used in a quantity of 0.05 to 1.0 parts by weight, preferably about 0.3 to 0.7 parts by weight, based on 100 parts by weight of component (b), 3. water is used in a quantity of 5 to 15 parts by weight, based on 100 parts by weight of component (b) and 4. the reaction of the components is carried out at an index below 90, preferably about 75 to 85.

8 Claims, No Drawings

PROCESS FOR THE PRODUCTION OF HEAT CURABLE FLEXIBLE POLYURETHANE MOLDED FOAMS

BACKGROUND OF THE INVENTION

1. Field of the Invention

The present invention is directed to a process for the production of heat curable, flexible, polyurethane molded foams and to the molded foams produced therefrom.

2. Description of the Prior Art

It is well known that heat curable, flexible, polyurethane molded foams are widely used, inter alia, in the construction of motor vehicles. The quality of the flexible polyurethane molded foams conventionally used for seats and back rests depends to a large extent upon their gross density. It has been found in practice that regardless of the nature of the basic raw materials (polyols/isocyanates) used for the production of the heat molded foams, a certain level of gross density is required for certain applications (seat, bench, back rest and required for meeting the requirements of these particular applications, especially in regard to the hard wearing properties in use.

The gross density obtained is primarily determined by the water content of the mixture of starting materials. The quantities of water used are typically up to 5 parts by weight (more typically about 2.5 to 3.5 parts by weight) per 100 parts by weight of polyol, depending upon the level of gross density required.

It has been found that the low gross densities desired in molded foams for the purpose of reducing weight and cost can only in exceptional cases be realized by increasing the water content beyond the quantities indicated. The reason for this is that as the water content increases (>3.5 parts by weight per 100 parts by weight of polyol), correct catalytic adjustment of the chemical reactions (polymer formation/gas formation) which is essential for the foaming process becomes more difficult and the range of allowable operating conditions becomes greatly restricted. Apart from problems relating to the nature of the skin (molding temperature/mold release agent) and the stability of the foam, the range allowed for the isocyanate index also becomes narrower. It is for these reasons that any reduction in the gross density required or desired is preferably brought about by means of physical blowing agents (e.g. halogenated hydrocarbons). This method is state of the art and applies in principle to all heat curable molded foams but is not to be recommended on ecological grounds and for reasons of cost.

It has now surprisingly been found that in addition to the usual range of 1 to 5 parts by weight of water, atypically large quantities of water, i.e., more than 5.0 parts by weight per 100 parts by weight of the polyol component, may readily be used with isocyanates, preferably of the toluylene diisocyanate type. As a result, gross densities as low as 15 kg/m$^3$ can be obtained in heat curable, flexible, polyurethane molded foams if carbonic acid diamide, preferably in a quantity of less than 1.0 part by weight, based on 100 parts by weight of the polyol component, and small quantities, preferably about 0.05 to 0.25 parts by weight, of an aminic co-catalyst are used and if, as a departure from the conventional practice of using an isocyanate index of 93 to 105, an index of less than 90, which is normally regarded as prohibitively low, is used for the foaming process.

Flexible polyurethane foams prepared with the addition of carbonic acid diamide have already been described in U.S. Pat. No. 3,479,304, but the required quantity of carbonic acid diamide is 1 to 5 parts by weight, based on 100 parts by weight of the polyol component. Water is used as the blowing agent in a quantity of 1 to 5 parts by weight, based on 100 parts by weight of the polyol component. In contrast to the process described in the present application, the process according to the U.S. Pat. in all cases uses halogenated isocyanates based on toluylene diisocyanate. The flexible polyurethane molded foams prepared according to the present invention require an aminic co-catalyst, preferably a tertiary amine, in addition to the carbonic acid diamide described above and the organic tin catalyst conventionally used for producing heat curable molded foams. The combination of an organic tin catalyst with a tertiary amine, however, is excluded in principle in the U.S. Pat.

The range for the isocyanate index set forth in the U.S. Pat. is from 90 to 120, in contrast to the process of the present invention which requires an index below 90. In addition, the process employed in the U.S. patent is directed to foaming in open molds instead of foaming inside closed molds in accordance with the present invention. The conditions used for foaming in closed molds and the physical properties of the resulting polyurethane foams differ substantially from the process of foaming in open molds and the products (free foam) obtained therefrom. The described after-heating of the foams is not required in accordance with the present invention.

SUMMARY OF THE INVENTION

The present invention is directed to a process for the production of heat curable, flexible, polyurethane molded foams by the reacting inside a closed mold
 (a) polyisocyanates with
 (b) compounds having a molecular weight of 400 to about 10,000 and containing at least two isocyanate-reactive groups and
 (c) optionally chain lengthening and/or cross-linking agents in the molecular weight range of 32 to 399 and containing at least two isocyanate-reactive groups in the presence of
 (d) a catalyst based on carbonic acid diamide and
 (e) a blowing agent based on water, characterized in that
  1. the polyisocyanates (a) are based on diphenylmethane diisocyanate which may optionally be alkyl substituted, toluylene diisocyanate, hexamethylene diisocyanate and/or isophorone diisocyanate,
  2. carbonic acid diamide is used in a quantity of 0.05 to 1.0 parts by weight, preferably about 0.3 to 0.7 parts by weight, based on 100 parts by weight of component (b),
  3. water is used in a quantity of 5 to 15 parts by weight, based on 100 parts by weight of component (b) and
  4. the reaction of the components is carried out at an index below 90, preferably about 75 to 85.

DETAILED DESCRIPTION OF THE INVENTION

The following starting materials are used according to the invention for the preparation of the flexible, polyurethane molded foams:

1. Polyisocyanates based on toluylene diisocyanate, e.g., 2,4-and/or 2,6-toluylene diisocyanate ("TDI"); diphenylmethane diisocyanate which may optionally be alkyl substituted such as 4,4'- and/or 2,4'-diphenylmethane diisocyanate (MDI), alkyl-substituted forms of MDI as described, for example, in DE-OS 2 935 318, DE-OS 3 032 128 and DE-OS 3 032 358, and polyphenylpolymethylene polyisocyanates which may be prepared by aniline-formaldehyde condensation followed by phosgenation ("crude MDI"); hexamethylene diisocyanate; isophorone diisocyanate; modified polyisocyanates prepared from the preceding polyisocyanates and containing carbodiimide groups, urethane groups, allophanate groups, isocyanurate groups, urea groups and biuret groups; and mixtures of these polyisocyanates.

The following types of TDI are preferably used as polyisocyanates according to the invention:
   toluylene diisocyanate as a mixture of 2,4- and 2,6-isomers in a ratio of 80:20 (T 80),
   toluylene diisocyanate as a mixture of 2,4- and 2,6-isomers in a ratio of 65:35 (T 65),
   toluylene diisocyanate prepolymers prepared by reacting an excess of TDI with the compounds described hereinafter under 2. and optionally 3. and mixtures of TDI with MDI and/or crude MDI.

2. Compounds containing at least two, preferably 2 to 8 and more preferably 2 to 6 isocyanate-reactive groups and having molecular weights of 400 to about 10,000, preferably about 1000 to 6000 and more preferably about 2000 to 6000. Included are compounds containing amino groups, thiol groups or carboxyl groups and preferably compounds containing hydroxyl groups, e.g., the hydroxyl group-containing polyethers, polyesters, polycarbonates and polyester amides conventionally used for the preparation of both homogeneous and cellular polyurethanes. Examples of these compounds are described, for example, in DE-OS 2 832 253, pages 11 to 18 (U.S. Pat. No. 4,263,408, herein incorporated by reference). These compounds preferably have an OH number of about 28 to 56.

3. Optionally, compounds having a molecular weight of 32 to 399 and containing at least two isocyanate-reactive hydrogen atoms. Included are compounds containing hydroxyl groups, amino groups, thiol groups and/or carboxyl groups, preferably hydroxyl groups and/or amino groups. These compounds are used as chain lengthening agents (functionality of 2) or cross-linking agents (functionality of greater than 2) and have 2 to 8, preferably 2 to 4 isocyanate-reactive groups. Examples of suitable compounds are described in DE-OS 2 832 253, pages 10 to 20 (U.S. Pat. No. 4,263,408, herein incorporated by reference.

4. Carbonic acid diamide (urea) in a quantity of 0.05 to 1.0 part by weight per 100 parts by weight of component (b).

5. Water in a quantity of 5 to 15 parts by weight per 100 parts by weight of component (b).

6. Optionally, auxiliary agents and additives such as
   (a) readily volatile organic substances as additional blowing agents,
   (b) known reaction accelerators and reaction retarders in known quantities, e.g., divalent or tetravalent organic tin compounds as catalysts, preferably tin salts of higher carboxylic acids,
   (c) surface active additives such as emulsifiers and foam stabilizers,
   (d) cell regulators (such as paraffins, fatty alcohols or dimethyl polysiloxanes), pigments or dyes, flame retardants (such as tris-chloroethyl phosphate or tricresyl phosphate), stabilizers against aging and weathering, plasticizers, fungistatic and bacteriostatic substances and fillers (such as barium sulphate, kieselguhr, carbon black or whiting).

These optional auxiliary agents and additives are described, for example, in DE-OS 2 732 292, pages 21 to 24 (U.S. Pat. No. 4,248,930, herein incorporated by reference).

Other examples of additives which may optionally be used according to the invention such as surface active additives, foam stabilizers, cell regulators, reaction retarders, stabilizers, flame retarding substances, plasticizers, dyes and fillers and fungistatic and bacteriostatic substances and details concerning their use and mode of action are described in Kunststoff-Handbuch, Volume VII, published by Vieweg and Hochtlen, Carl-Hanser-Verlag, Munich 1966, e.g. on pages 103 to 113.

In carrying out the process according to the invention, the starting components are reacted together by the known one-shot process, the prepolymer process or the semiprepolymer process, preferably using mechanical devices, e.g., those described in U.S. Pat. No. 2,764,565. Details concerning the apparatus suitable for conducting the process of this invention are given in Kunststoff-Handbuch, Volume VII, published by Vieweg and Hochtlen, Carl-Hanser-Verlag, Munich 1966, e.g. on pages 121 to 205.

In the process according to the invention, the components are reacted together at an isocyanate index below 90, preferably an index of about 75 to 85.

The index is frequently used with regard to the preparation of polyurethane foams and is an indication of the degree of cross-linking of a foam. It is customary to regard a foam as produced with an index of 100 if the actual number of isocyanate groups corresponds to the theoretical number of isocyanate groups required to react with all of the isocyanate-reactive groups. The index may therefore be used to determine whether the actual number of isocyanate groups is less than or more than the number required to react with all of the isocyanate-reactive groups. The index is calculated from the following formula:

$$\text{index} = \frac{\text{actual number of isocyanate groups} \times 100}{\text{theoretical number of isocyanate groups required to react with all of the isocyanate-reactive groups}}$$

According to the present invention, foaming is carried out in closed molds The reaction mixture is introduced into a mold which may be made of a metal such as aluminium or sheet iron. The reaction mixture foams up inside the mold and forms the molded article. When the mold has been completely filled with foam, it is heated in an oven at temperatures above 100° C.

According to the present invention, this procedure may be carried out by introducing an amount of foamable reaction mixture into the mold which is just sufficient to fill the mold with foam or, alternatively, by introducing a larger quantity of reaction mixture than is necessary for filling the interior of the mold. The latter procedure is known as "over charging" and has been disclosed, e.g., in U.S. Pat. Nos. 3,178,490 and 3,182,104.

The flexible molded polyurethane foams obtained according to the invention may be used, for example, for seating or reclining furniture and for seats and back rests in vehicles, preferably in motor vehicles.

EXAMPLES

Preparation of the flexible molded foams according to the invention was carried out by vigorously mixing the components of the following formulation and introducing the resulting reactive mixture into a mold which can be closed on all sides.

The quantities given in all of the tables are parts by weight.

Polyether A: a trifunctional PO/EO polyether based on about 5% EO and having an OH number of 56
Polyether B: a trifunctional PO/EO polyether based on about 14% EO and having an OH number of 56
Polyether C: a trifunctional PO/EO polyether based on about 18% EO, having an OH number of 35 and containing about 20% by weight of organic filler
Catalyst 1: carbonic acid diamide (urea)
Catalyst 2: N,N-dimethyl ethanolamine
Catalyst 3: bis-(2-dimethylaminoethyl)-ether, 70% in dipropylene glycol
Catalyst 5: tin(II)-(2-ethyl-hexoate)
Tegostab B 4900: product of TH Goldschmidt AG
Tegostab B 8002: product of TH Goldschmidt AG
Isocyanate Y: toluylene diisocyanate as a mixture of 2,4- and 2,6-isomers in a ratio of 65:35 (T 65) and having an NCO content of 48.3%
Isocyanate Z: toluylene diisocyanate as a mixture of 2,4- and 2,6-isomers in a ratio of 80:20 (T 80) and having an NCO content of 48.3%
Catalyst 4: triethylen diamine, 33 % b.w. in dipropylene glycol

TABLE I

|  | EXAMPLES | | | | | | | |
|---|---|---|---|---|---|---|---|---|
|  | 1 | 2 | 3 | 4 | 5 | 6 | 7 | 8 |
| Polyether A | — | — | 100 | — | — | 100 | — | — |
| Polyether B | 100 | 100 | — | 100 | 100 | — | 100 | 70 |
| Polyether C | — | — | — | — | — | — | — | 30 |
| Water | 5.0 | 7.0 | 6.5 | 6.5 | 5.5 | 8.0 | 6.0 | 7.5 |
|  |  |  |  |  |  |  |  | 0.5 |
| Catalyst 1 | 0.7 | 0.7 | 0.5 | 0.7 | 0.5 | 0.7 | 0.3 | — |
| Catalyst 2 | — | — | — | 0.2 | — | — | — | 0.1 |
| Catalyst 3 | 0.15 | 0.1 | 0.15 | — | — | — | 0.1 | — |
| Catalyst 4 | — | — | — | — | 0.1 | 0.1 | — | — |
| Catalyst 5 | 0.07 | 0.07 | 0.11 | 0.08 | 0.07 | 0.10 | 0.16 | 0.08 |
| Tegostab B 4900 | 1.0 | 1.3 | 1.5 | — | — | — | — | 1.5 |
| Tegostab B 8002 | — | — | — | 1.5 | 1.3 | 1.5 | 1.5 | — |
| Isocyanate Y | — | — | — | — | — | — | 30 | — |
| Isocyanate Z | + | + | + | + | + | + | 70 | + |
| Index | 89 | 80 | 85 | 80 | 85 | 75 | 85 | 89 |

TABLE II

|  | EXAMPLES | | | | | | | |
|---|---|---|---|---|---|---|---|---|
|  | 1 | 2 | 3 | 4 | 5 | 6 | 7 | 8 |
| Gross density (kg/m$^3$) | 29 | 23 | 18 | 22 | 22 | 22 | 22 | 20 |
| Compression Resistance 40% (kPa) | 4.0 | 2.6 | 3.0 | 3.5 | 3.6 | 3.6 | 3.3 | 4.4 |
| Tensile Strength (kPa) | 113 | 122 | 122 | 104 | 109 | 107 | 115 | 94 |
| Elongation at Break (%) | 115 | 193 | 190 | 127 | 161 | 121 | 152 | 87 |
| Pressure Deformation Residue 50% (%) | 4.2 | 4.1 | 6.1 | 8.3 | 5.0 | 9.9 | 9.9 | 13.9 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of heat curable, flexible, polyurethane molded foam which comprises reacting inside a closed mold at an isocyanate index below 90

(a) a polyisocyanate comprising a member selected from the group consisting of diphenylmethane diisocyanate, toluylene diisocyanate, hexamethylene diisocyanate and isophorone diisocyanate with
   (b) a compound having a molecular weight of 400 to about 10,000 and containing at least two isocyanate-reactive groups and
   (c) optionally a chain lengthening and/or cross linking agent having a molecular weight of 32 to 399 and containing at least two isocyanate-reactive groups in the presence of
   (d) carbonic acid diamide as catalyst in an amount of 0.05 to 1.0 parts by weight, based on 100 parts of component (b) and
   (e) water as blowing agent in an amount of 5 to 15 parts by weight, based on 100 parts of component (b).

2. The process of claim 1 wherein said carbonic acid diamide is present in an amount of about 0.3 to 0.7 parts by weight, based on 100 parts of component (b).

3. The process of claim 1 wherein the reaction is conducted at an isocyanate index of about 75 to 85.

4. The process of claim 2 wherein the reaction is conducted at an isocyanate index of about 75 to 85.

5. A heat curable, flexible, polyurethane molded foam which is prepared by a process which comprises reacting inside a closed mold at an isocyanate index below 90

(a) a polyisocyanate comprising a member selected from the group consisting of diphenylmethane diisocyanate, toluylene diisocyanate, hexamethylene diisocyanate and isophorone diisocyanate with
   (b) a compound having a molecular weight of 400 to about 10,000 and containing at least two isocyanate-reactive groups and
   (c) optionally a chain lengthening and/or cross linking agent having a molecular weight of 32 to 399 and containing at least two isocyanate-reactive groups in the presence of
   (d) carbonic acid diamide as catalyst in an amount of 0.05 to 1.0 parts by weight, based on 100 parts of component (b) and
   (e) water as blowing agent in an amount of 5 to 15 parts by weight, based on 100 parts of component (b).

6. The molded foam of claim 5 wherein said carbonic acid diamide is present in an amount of about 0.3 to 0.7 parts by weight, based on 100 parts of component (b).

7. The molded foam of claim 5 wherein the reaction is conducted at an isocyanate index of about 75 to 85.

8. The molded foam of claim 6 wherein the reaction is conducted at an isocyanate index of about 75 to 85.

* * * * *